INVENTORS.
EDMUND P. WOZNIAK
KEN MATSUDA
BY
ATTORNEY.

2,979,547
PRODUCTION OF DITOLYLETHANE

Edmund Paul Wozniak, Rivervale, N.J., and Ken Matsuda, Stamford, Conn., assignors to American Cyanamid Company, New York, N.Y., a corporation of Maine Filed Sept. 22, 1958, Ser. No. 762,429

4 Claims. (Cl. 260—668)

This invention relates to the manufacture of ditolylethane by the reaction of acetylene with toluene, and more particularly to improvements in the separation and recovery of products and by-products from the alkylation reaction.

Ditolylethane is produced commercially as an intermediate from which methylstyrene is obtained. In one commercial process for the production of this intermediate, acetylene is introduced into admixture with a substantial excess of toluene using strong sulfuric acid containing a mercury salt such as mercuric chloride or mercuric sulfate as catalyst; this process is described in U.S. Patent No. 2,734,928, dated February 14, 1956. High yields of ditolylethane are obtained, but in the practical operation of the process it is necessary to recover and recycle the excess toluene. It is also highly desirable to recover the sulfuric acid in a commercially useful form, which necessitates the removal of the mercury and tars formed during the alkylation reaction.

Heretofore the stream of alkylator effluent has been discharged into a settling tank or decanter and allowed to separate into two layers. The upper layer containing the ditolylethane and excess toluene has been withdrawn, washed with alkali and distilled for the separation and recovery of its ingredients; the lower layer was further treated for recovery of the sulfuric acid. It is a principal object of the present invention to provide improvements in this separation treatment and in the further treatment of the lower acid layer, whereby substantially increased recoveries of toluene and of sulfuric acid are obtained as will hereinafter be more fully described.

As the alkylator effluent is settled to obtain the phase separation described above, there is a substantial sulfonation of the excess toluene present so that much of the toluene is converted into toluene sulfonic acid (TSA) which dissolves in the acid phase. We have found that this undesired sulfonation can be very substantially reduced by mixing controlled amounts of water with the effluent. We have also discovered that this controlled water mixing, or quenching, when properly conducted, assists materially in obtaining a physical separation of tars and mercury as an interphase layer between the upper alkylate product and the bottom acid layer in the separator. The formation and removal of this interphase layer results in a lower content of tar and mercury in the by-product acid from the process.

Figure 1:
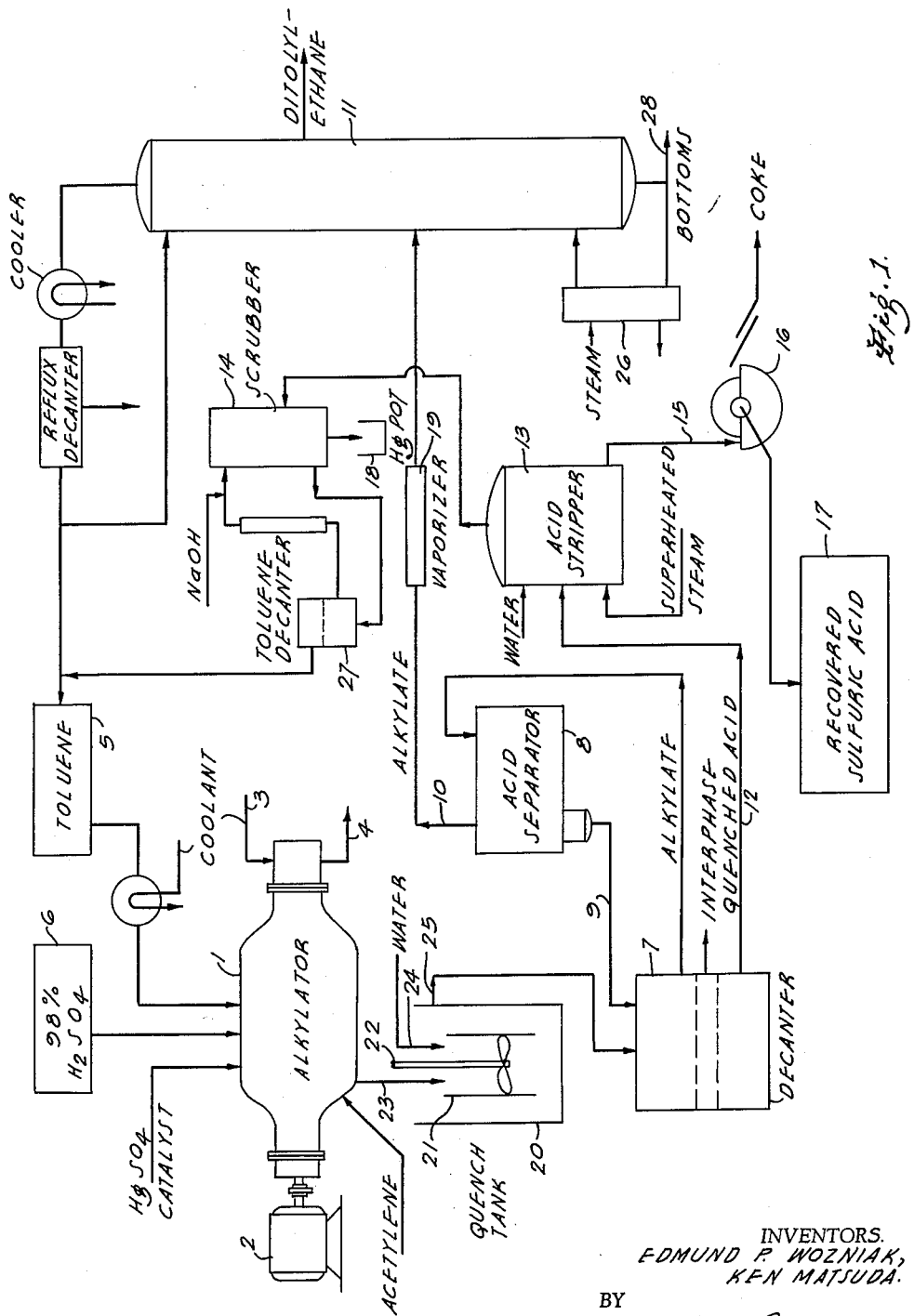
Figure 4:
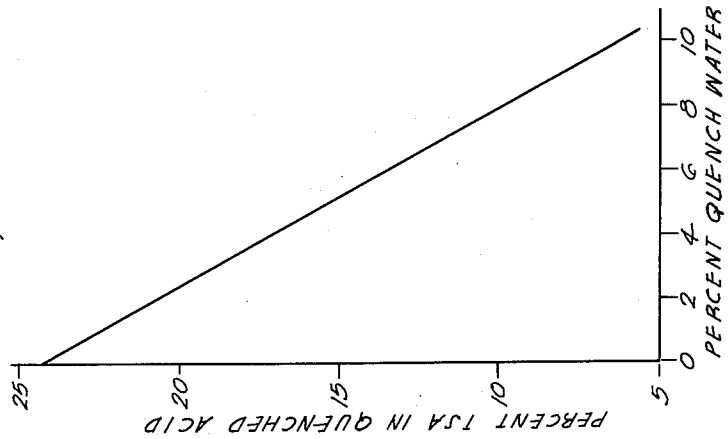
Figure 3:
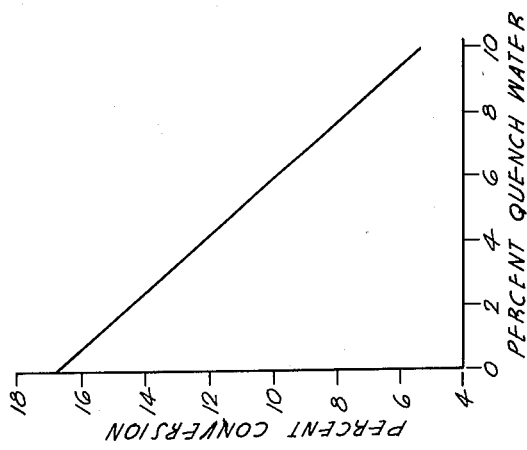
Figure 2:
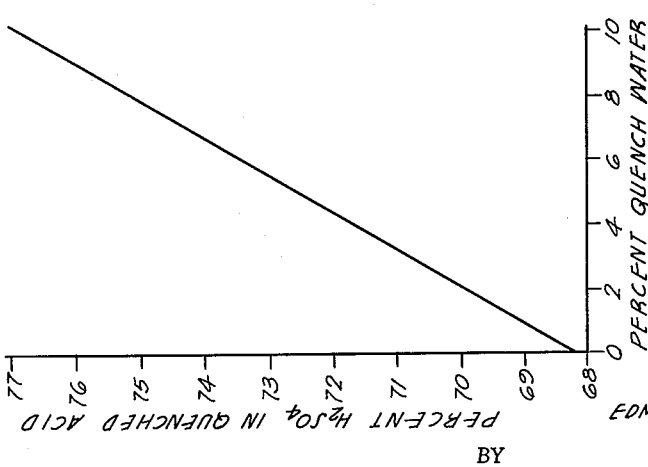

The invention will be further described with reference to the accompanying drawing wherein:

Fig. 1 is a flow sheet showing diagrammatically a process for the production of ditolylethane and recovery of by-products in which one embodiment of the invention is incorporated, and Figs. 2-4 are graphs showing the improvements obtained when varying amounts of quench water are added to the alkylator effluent.

Referring to Fig. 1, the alkylator is indicated generally by reference numeral 1. This is a reaction vessel equipped with an agitator operated by a motor 2 and with internal cooling coils through which a suitable coolant such as liquid ammonia is introduced and withdrawn as through lines 3 and 4, respectively. The alkylator is charged continuously with a stream of toluene from a toluene storage tank 5, a stream of strong sulfuric acid from tank 6, and a stream of mercuric sulfate or other mercury salt along with sufficient water to bring the sulfuric acid concentration within the alkylator to about 95% $H_2SO_4$. The resulting mixture is maintained at about 0°–10° C. while acetylene is continuously introduced and reacted with the toluene. It will be understood that this process can be carried out in a single alkylator or in a series of stages as described in the patent referred to above.

As the separation and recovery process was previously operated, the effluent from the alkylator 1 was discharged into a separation tank or decanter 7 having sufficient capacity to permit its separation into layers. The top layer was withdrawn into an acid separator 8 in which it was trickled over packing to separate entrained sulfuric acid which was returned to the decanter 7 through line 9. The alkylate withdrawn from the acid separator through line 10 was washed with aqueous caustic solution, vaporized in a flask vaporizer 19 and fractionated in a fractionating column 11.

The bottom layer containing the sulfuric acid, much of the tar and up to 25–30% of toluene sulfonic acid was withdrawn from the decanter 7 through line 12 and introduced into an acid stripper 13 where the toluene sulfonic acid was largely decomposed and the mercury content was removed by stripping with superheated steam as described in U.S. Patent No. 2,832,810. The resulting vapors were recovered by contacting them with a recirculating alkaline solution in scrubber 14, wherein the mercury and toluene were condensed and oxides of sulfur were neutralized. The stripped acid was discharged through line 15 to a filter 16, which removed the coke, and was then collected in a storage tank 17.

In accordance with one of the improvements of the present invention a quench tank 20 is interposed between the alkylator 1 and the separating tank or decanter 7. The quench tank is a preferably cylindrical vessel containing a central vertical baffle 21 and an agitator 22 to promote rapid and thorough mixing of water with the alkylator effluent. A stream of this effluent and a stream of water are preferably discharged into the quench tank within the central baffle through lines 23 and 24, respectively, while the quenched effluent is withdrawn through an overflow line 25 leading to the decanter 7.

The important advantages obtained by mixing water with the alkylator effluent in the quench tank 20 are shown in Figs. 2–4 of the drawings. Fig. 2 shows that the strength of the quenched acid increases steadily when increasing quantities of water are mixed with the alkylator effluent; the curve shows that the diluting action of the quench water is more than offset by the reduced loss of sulfuric acid caused by the sulfonation reaction. Fig. 4 is a plot of the quantity of toluene sulfonic acid in the quenched acid against the amount of quench water added, and shows that the TSA content of the acid can be reduced from about 25% to 5% or less by this procedure. Fig. 3 shows substantially the same results in terms of the percent of conversion of sulfuric acid to toluene sulfonic acid with varying percentages of quench water.

It will be seen from these graphs that material improvements are obtained when even small amounts of quench water are mixed with the alkylator effluent, and that this improvement continues with increasing quantities of water until about 12% of quench water is added. These quantities of quench water are based on the weight of the sulfuric acid introduced into the alkylator. We have found that the toluene sulfonic acid begins to precipitate in the decanter 7 when more than about 12% of quench water is used, and therefore the range of about 11–12% of water, based on the sulfuric acid, represents the maximum quantity to be used in practicing this feature of our invention.

The second important advantage of our invention, which is the formation of a separable interphase layer in the decanter 7, is realized after a minimum of about 6% of water has been mixed with the alkylator effluent. When the quantity of quench water is within the range of from 6% to about 12%, settling of the quenched alkylate results in the formation of an intermediate or interphase layer between the top layer of organic material and the bottom layer of spent acid. This interphase is considerably smaller in quantity than either the top or the bottom layer, but it contains a major proportion of the tar and most of the mercury along with minor quantities of toluene sulfonic acid and some sulfuric acid. It is drawn off separately from the other layers and is preferably treated for recovery of its mercury content, as by digesting with hydrochloric acid or other suitable acid capable of converting the mercury into a water-soluble mercury salt that can be separated from the tarry phase and reused in the alkylator.

A further important feature of our invention consists in the determination of optimum conditions that should be maintained in the acid stripper 13. We have found that the rate and extent of decomposition of the toluene sulfonic acid in this step can be materially increased by diluting the quenched acid with a limited amount of water such that the sulfuric acid concentration of the acid after stripping is within the range of from 65% to 72% and by maintaining the stripping temperature within the range of 160°–175° C. and preferably at 160°–165° C. When superheated steam having a temperature of about 190°–220° C. or higher is injected into the spent acid under these conditions as much as 80% of the toluene sulfonic acid in the spent sulfuric acid can be decomposed into toluene and oxides of sulfur which pass into the scrubber 14 with the steam. The toluene vapors are condensed by the scrubbing liquid and are recovered in the toluene decanter 27 while the oxides of sulfur react with the alkaline scrubbing liquid and are converted into sodium sulfate or sulfite or a mixture thereof.

The invention will be further described and illustrated by the following specific examples. It should be understood, however, that although these examples may describe certain specific ratios of reagents and operating conditions they are given primarily for purposes of illustration and the invention in its broader aspect is not limited thereto.

EXAMPLE 1

*Quenching and decanting*

The commercial production of ditolylethane is carried out as an essentially continuous process, the reagents being pumped continuously through one or more alkylators of the type illustrated in the drawings and a continuous stream of reaction products being discharged into the decanter 7. The present invention can best be described, however, with reference to the quantities of reagents passed through the alkylator and other equipment per unit of time.

When 1500 lbs. of acetylene are reacted at 5° C. with a mixture of 37,400 lbs. of toluene, 4766 lbs. of sulfuric acid, 250 lbs. of water (added with the catalyst) and 13 lbs. of mercuric sulfate (containing 8.8 lbs. of mercury) and the effluent is discharged directly into the decanter 7 without adding water a typical composition for the acid in the bottom layer is 65% $H_2SO_4$; 22% TSA (toluene sulfonic acid), 7% water and 6% tar. When the alkylator effluent was discharged into the quench tank 20 and the overflow was separated into layers in the decanter 7, but without adding water, representative analyses expressed on a tar-free basis were as follows:

| | Quench Tank | Decanter-Acid Layer |
|---|---|---|
| Percent $H_2SO_4$ | 68.3 | 63.0 |
| Percent TSA | 24.0 | 29.3 |
| Percent $H_2O$ | 7.7 | 7.7 |

These figures show that there is progressive sulfonation of the toluene, with a corresponding loss in acid, while the effluent is being separated in the decanter. This is confirmed by the fact that acid separated from samples taken directly from the alkylator discharge usually shows a TSA content of about 8–10%, indicating that this is the amount of sulfonation that takes place within the alkylator.

When water was introduced into the quench tank along with the alkylator effluent in increasing amounts from 0.05 to 0.11 pound per pound of sulfuric acid charged to the alkylator there was a steady reduction in the toluene sulfonic acid content and a steady increase in the sulfuric acid concentration of the quenched acid despite the diluting effect of the quench water. The quantitative results obtained from analyses made over several days operation with varying proportions of quench water are shown graphically in Figs. 2–4 of the drawings. It will be seen that the content of toluene sulfonic acid is reduced to about 4% while the sulfuric acid strength increases to about 77%. The reduction in TSA represents a substantial savings both in toluene and in sulfuric acid consumed in the process.

When amounts of quench water within the range of about 6–12% were added in the quench tank 20, there was a remarkable improvement in the operation of the decanter 7. The quenched alkylate mixture separated readily into three layers; a bottom layer containing only about 1–2% or less of tar and only a small percentage of the mercury, a top alkylate layer, and an interphase layer containing most of the tar and mercury. The amounts of this interphase layer decreases as the percent of quench water increases. The strength and TSA content of the acid in the bottom layer with increasing percentages of quench water are shown in Figs. 2 and 4 of the drawings.

After the quantities of reagents described above had been reacted and quenched with 475 lbs. of water the top layer weighed 38,152 lbs. and contained 10,700 lbs. of ditolylethane, 26,681 lbs. of toluene, 695 lbs. of tar, 76 lbs. of sulfuric acid and 0.1 lb. of mercury. The interphase weighed 630 lbs. and contained 326 lbs. of tar, 82 lbs. of TSA, 164 lbs. of sulfuric acid and 7.6 lbs. of mercury. The bottom layer weighed about 5700 lbs. and contained 1.5% of tar and 1.1 lbs. of mercury.

EXAMPLE 2

*Steam stripping the waste acid*

In the acid stripper 13 the mercury and toluene sulfonic acid are removed from the waste acid and the tar is converted into coke by stripping with superheated steam. The TSA is decomposed into toluene which is vaporized along with the mercury and oxides of sulfur and condensed in the caustic scrubber 14.

We have found that in this operation the best results are obtained when both the water content and the batch temperature are controlled within certain limits. The water content should be such that the ratio of sulfuric acid to sulfuric acid plus water at the end of the stripping run is about 65–72%; this includes the water condensed from the steam used to heat the batch to stripping temperatures as well as the dilution water, which is ordinarily a quantity such as to bring the ratio to about 75%. The batch should be maintained at about 160°–175° C. while the superheated steam is being injected, and preferably at 160°–165° C.

The bottom layer of acid of Example 1 was stripped by this procedure. It contained about 4250 lbs. of sulfuric acid, about 350 lbs. of TSA, 1000 lbs. of water and 85 lbs. of tar. The batch was charged into the stripper 13 and agitated as 450 lbs. of water were added. Superheated steam at about 200° C. was then injected until the batch temperature reached 160°–165° C. and the injection was continued for an additional 2 hours at this temperature using a total of 1400 lbs. of steam. The stripped acid was then filtered free from coke. The filtered acid contained 20 lbs. of toluene sulfonic acid and 0.03% of mercury.

The mixture of steam, mercury, toluene vapor and oxides of sulfur from the stripper was scrubbed with cold aqueous sodium hydroxide solution in the scrubber 14. All of the mercury was recovered in the mercury pot 18. About 150 lbs. of toluene were separated from the recirculating scrubbing liquid and pumped to the toluene storage tank.

EXAMPLE 3

*Recovery of ditolylethane*

The top alkylate layer from the decanter 7 after separating as much sulfuric acid as possible in the acid separator 8 is neutralized by washing with an aqueous 10% sodium hydroxide solution. It is then vaporized by heating in the vaporizer 19 and introduced into the fractionating column 11 where the toluene is separated as an overhead fraction and the ditolylethane is taken off as a side stream. A portion of the tars and other heavy residues constituting the bottom fraction are heated in the reboiler 26 and reintroduced into the column while the remainder is drawn off through line 28.

In a typical fractionation the column operates under atmospheric pressure. The reboiler 26 is operated to maintain a bottoms temperature of 500° F. and about 40 mols of steam for each mol of ditolylethane are introduced into the base of the column. The top temperature is 180°–190° F. The ditolylethane withdrawn from an intermediate plate of the column is preferably stripped with steam and is obtained with a 99% recovery as an essentially pure product, the stripping steam and volatiles being returned to the column.

We claim:
1. In the production of ditolylethane by the reaction of acetylene with excess toluene in the presence of a dispersion of a mercury salt in strong sulfuric acid and settling the resulting alkylate mixture into a top layer containing ditolylethane and unreacted toluene and a bottom layer containing toluene sulfonic acid and sulfuric acid, the method of reducing toluene sulfonic acid formation which comprises quenching said alkylate mixture by mixing therewith a small amount of water up to 12% by weight of water based on the weight of said sulfuric acid.

2. A method according to claim 1 in which the quantity of water added is at least 6% and the top and bottom layers are separated by an interphase layer containing most of the tar formed during the reaction and most of the mercury.

3. A method according to claim 1 in which the bottom layer is withdrawn and stripped of toluene sulfonic acid and residual mercury by the injection of superheated steam while maintaining it at temperatures of about 160°–175° C.

4. A method of separating toluene sulfonic acid and mercury from a spent sulfuric acid obtained by settling an alkylate mixture produced by reacting acetylene with toluene in the presence of a dispersion of a mercury salt in strong sulfuric acid which comprises quenching said alkylate mixture with a small amount of water up to 12% by weight based on the weight of said sulfuric acid mixing diluting water with said spent acid and injecting superheated steam therein until substantially all of the mercury and most of the toluene sulfonic acid are removed while maintaining it at 160°–175° C., the quantity of dilution water being such that the sulfuric acid concentration of the stripped acid is within the range of 65–72%.

References Cited in the file of this patent

UNITED STATES PATENTS

| | | |
|---|---|---|
| 2,734,928 | Smolin | Feb. 14, 1956 |
| 2,832,810 | Smolin | Apr. 29, 1958 |

UNITED STATES PATENT OFFICE
CERTIFICATION OF CORRECTION

Patent No. 2,979,547                                    April 11, 1961

Edmund Paul Wozniak et al.

It is hereby certified that error appears in the above numbered patent requiring correction and that the said Letters Patent should read as corrected below.

Column 6, line 13, beginning with "2. A method according to claim 1" strike out all to and including "the mercury." in line 17; lines 18 and 23, for the claims now appearing in the patent numbered "3" and "4" read -- 2 -- and -- 3 --; same column, line 36, after "65-72%." insert the following as claim 4:

> 4. In the production of ditolylethane by the reaction of acetylene with excess toluene in the presence of a dispersion of a mercury salt in strong sulfuric acid and settling the resulting alkylate mixture into a top layer containing ditolylethane and unreacted toluene and a bottom layer containing toluene sulfonic acid and sulfuric acid, the method of reducing toluene sulfonic acid formation which comprises quenching said alkylate mixture by mixing therewith at least 6% and up to 12% by weight of water based on the weight of said sulfuric acid, thereby separating said top layer and bottom layer by an interphase layer containing most of the tar formed during the reaction and most of the mercury.

Signed and sealed this 3rd day of October 1961.

(SEAL)
Attest:

ERNEST W. SWIDER                            DAVID L. LADD
Attesting Officer                          Commissioner of Patents